(12) United States Patent
Liu

(10) Patent No.: US 7,604,387 B2
(45) Date of Patent: Oct. 20, 2009

(54) BACKLIGHT MODULE

(75) Inventor: Pang-Hsuan Liu, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 6 days.

(21) Appl. No.: 11/830,856

(22) Filed: Jul. 31, 2007

(65) Prior Publication Data

US 2008/0259635 A1   Oct. 23, 2008

(30) Foreign Application Priority Data

Apr. 17, 2007   (TW) .............................. 96113523 A

(51) Int. Cl.
 *F21V 7/04* (2006.01)
(52) U.S. Cl. ........................ 362/606; 362/615; 362/621; 362/628
(58) Field of Classification Search ................. 362/282, 362/606, 615, 624, 628, 631, 632
See application file for complete search history.

(56) References Cited

U.S. PATENT DOCUMENTS

| 7,073,933 | B2* | 7/2006 | Gotoh et al. ................. 362/624 |
| 7,364,343 | B2* | 4/2008 | Keuper et al. ............... 362/628 |
| 2005/0180167 | A1* | 8/2005 | Hoelen et al. ............... 362/613 |

FOREIGN PATENT DOCUMENTS

JP   2004-171948   6/2004

* cited by examiner

*Primary Examiner*—John A Ward
(74) *Attorney, Agent, or Firm*—Winston Hsu

(57) ABSTRACT

A backlight module has a light guide plate and a light source. The light guide plate contains a top plane, a bottom plane opposite to the top plane, a light entrance plane positioned between the top plane and the bottom plane, and a widened edge plane opposite to the light entrance plane. The widened edge plane is slanted relative to the light entrance plane.

15 Claims, 4 Drawing Sheets

BACKLIGHT MODULE

BACKGROUND OF THE INVENTION

1. Field of the Invention

The present invention relates to a backlight module, and more particularly, to a backlight module with a light guide plate that is widened from the light entrance plane toward another side plane.

2. Description of the Prior Art

With the rapid development of technology, various kinds of intelligent information products are available to people living in modern societies. Flat display modules, such as liquid crystal display modules, have played quite an important role in information products. Since the flat display module has the characteristics of a light and portable configuration, low power consumption, no radiation pollution, and so on, it has been widely applied to portable information products, such as notebooks, personal digital assistants (PDAs), and cellular phones, etc.

Conventionally, a liquid crystal display device includes a backlight module for providing back light source to the liquid crystal display panel. Referring to FIG. 1, FIG. 1 is a sectional schematic view of a conventional backlight module 10. The conventional backlight module 10 contains a light source 12, a light guide plate 14, a reflector 22 disposed below the light guide plate 14, a housing 16, a plurality of optical films 18, and a printed circuit board (PCB) 20 disposed below the light source 12. The PCB 20 is used for transferring currents or control signals to the light source 12. The light exit plane 12a of the light source 12 faces the light entrance plane 14a of the light guide plate 14 and is positioned nearby the light entrance plane 14a. In addition, the position level of the light exit plane 12a of the light source 12 is approximately the same as the position level of the light entrance plane 14a of the light guide plate 14 so that light emitted from the light source 12 directly progresses into the light guide plate 14 through the light entrance plane 14a for avoiding light loss. The light guide plate 14 is a flat plate with a uniform thickness. As light progresses into the light guide plate 14, it will propagate in the light guide plate 14 and pass through the light exit plane 14b, the optical films 18 into the liquid crystal display panel (not shown).

As shown in FIG. 1, the PCB 20 has a certain thickness and has to be disposed below the light source 12, such that the part at the side of the light source 12 of the backlight module 10 is thicker than the thickness of the entire flat light guide plate 14. As a result, the housing 16 for containing all the elements of the backlight module 10 has to be designed with a deep containing space according to the total thickness of the part at the side of the light source 12 of the backlight module 10 for positioning the light source 12 and the PCB 20, while the other portion of the housing 16 for positioning the light guide plate 14 has a shallow containing space. Therefore, the housing 16 usually has a winding portion 24, which brings a difficulty in fabrication process of the housing 16. As mentioned above, the conventional backlight module 10 has a large thickness at the side of the light source 12, which is thicker than the side of the light guide plate 14. For example, the thickness difference between the two sides may be about 0.2 millimeters (mm) to 0.3 mm. However, it is an intolerable thickness difference for portable information products under a market requirement of light volume, and the thickness difference of two sides of the backlight module 10 also influences the whole design structures of the application electronic products. Accordingly, the design of structure of the conventional backlight module 10 has to be kept on study for meeting the market requirement of its application products.

Mostly, the conventional light guide plate 14 is formed by injection molding method, and the light guide plate 14 in the liquid crystal display device of common portable products is about 0.8 mm, which has reached the limitation of the injection molding technology. Furthermore, the yield of injection molding process decreases as the thickness of the light guide plate 14 reduces. Therefore, how to design the thickness or structure of the light guide plate 14 to conform to the current injection molding technology for producing the light guide plate 14 with a good yield is still an unsolved issue.

SUMMARY OF THE INVENTION

It is an object of the claimed invention to provide a light guide plate with a thickness widened from the side of the light entrance plane toward the other side of the light guide plate.

According to the claimed invention, the backlight module comprises a light guide plate and a light source positioned at a side of the light guide plate. The light guide plate comprises a top plane, a bottom plane opposite to the top plane, a light entrance plane positioned between the top plane and the bottom plane, and a widened edge plane with an area larger than that of the light entrance plane. The bottom plane is not parallel to the top plane and is slanted relative to the top plane. The widened edge plane is disposed between the top plane and the bottom plane, opposite to the light entrance plane. The light entrance plane faces the light source so that light produced by the light source directly enters the light guide plate.

It is an advantage of the claimed invention that the light guide plate has an un-uniform thickness and the area of the widened edge plane is larger than the area of the light entrance plane so that the light guide plate can be fabricated by injecting materials at the side of the widened edge plane during an injecting molding process, so as to improve the yield of the light guide plate.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
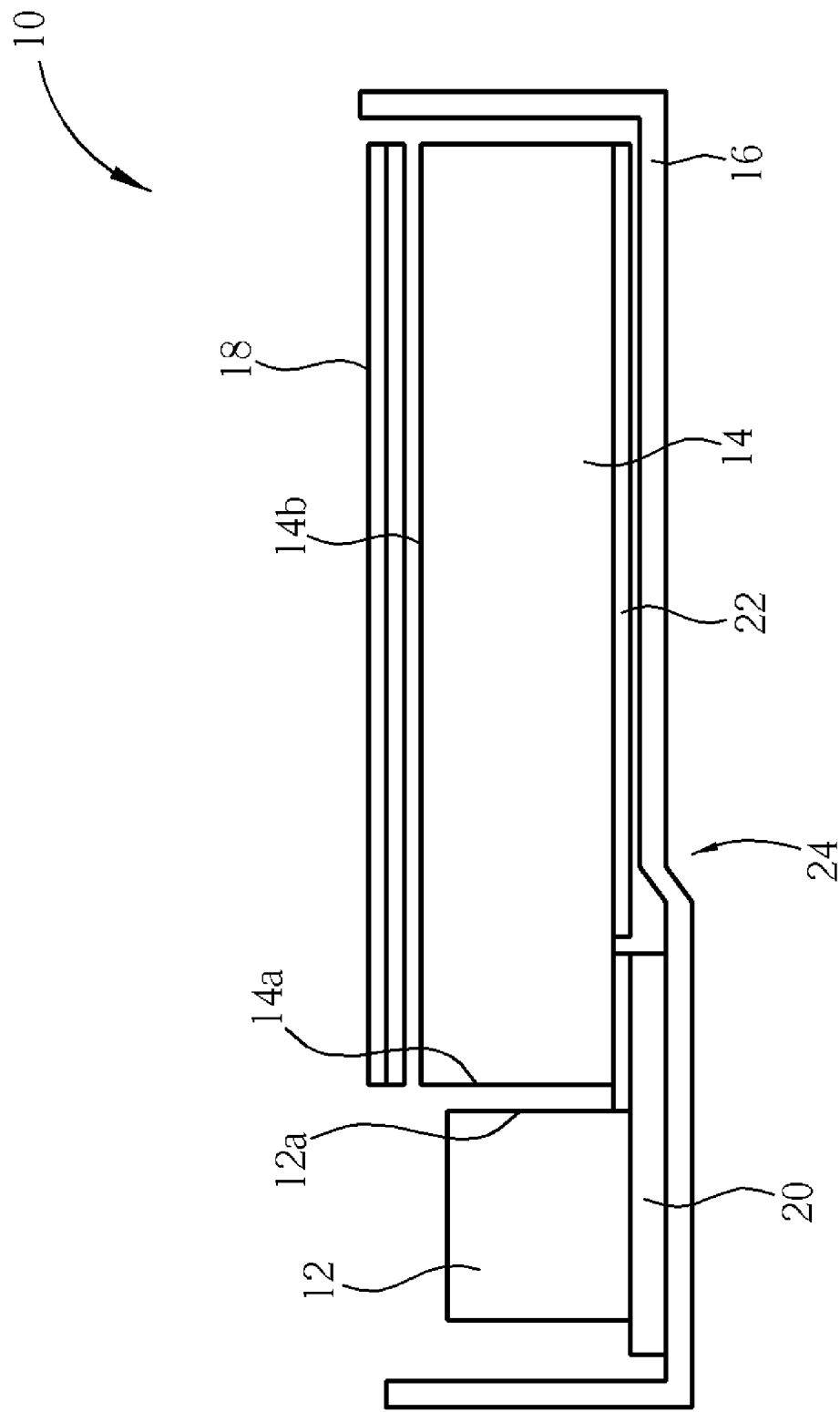
FIG. 1 is a sectional schematic diagram of a conventional backlight module.
Figure 2A:
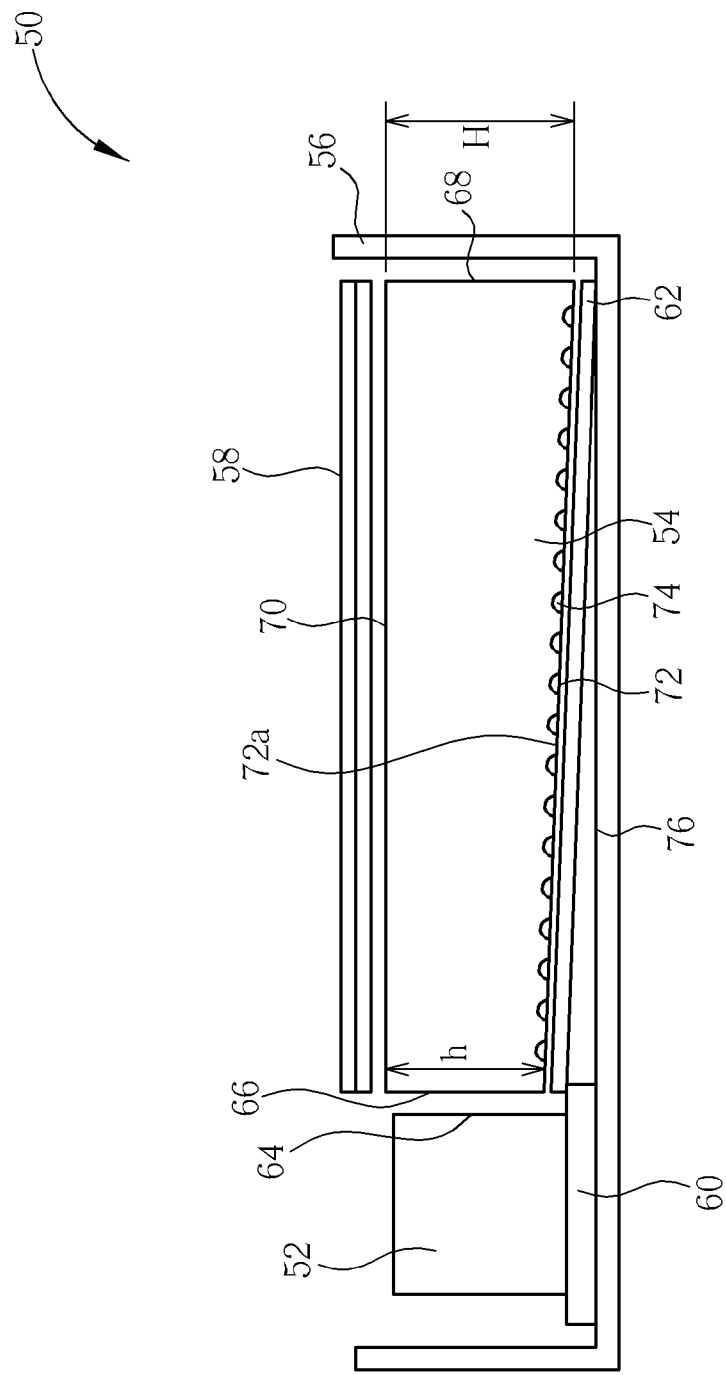
FIGS. 2A-2B are sectional schematic diagrams of a backlight module according to a first embodiment of the present invention.

Referring to FIG. 2A, FIG. 2A is a sectional schematic diagram of a backlight module according to a first embodiment of the present invention. The present invention backlight module 50 can be applied to a liquid crystal display device or other devices in need of a back light source. The backlight module 50 comprises a light guide plate 54, a light source 52 positioned at a side near the light entrance plane 66 of the light guide plate 54, a housing 56 for containing the light source 52 and the light guide plate 54, a circuit board 60 positioned below the light source 52, and plurality of optical films 58 positioned above the light guide plate 54. The light source 52 comprises at least a light emitting diode (LED) or other appropriate light generator elements. The circuit board 60 is preferably a PCB. Since the circuit board 60 has a certain thickness, the two sides of the backlight module 50 will have different thickness in a prior-art backlight module. Therefore, the light guide plate 54 with a wedge-shaped structure is designed according to the present invention.

Figure 2B:
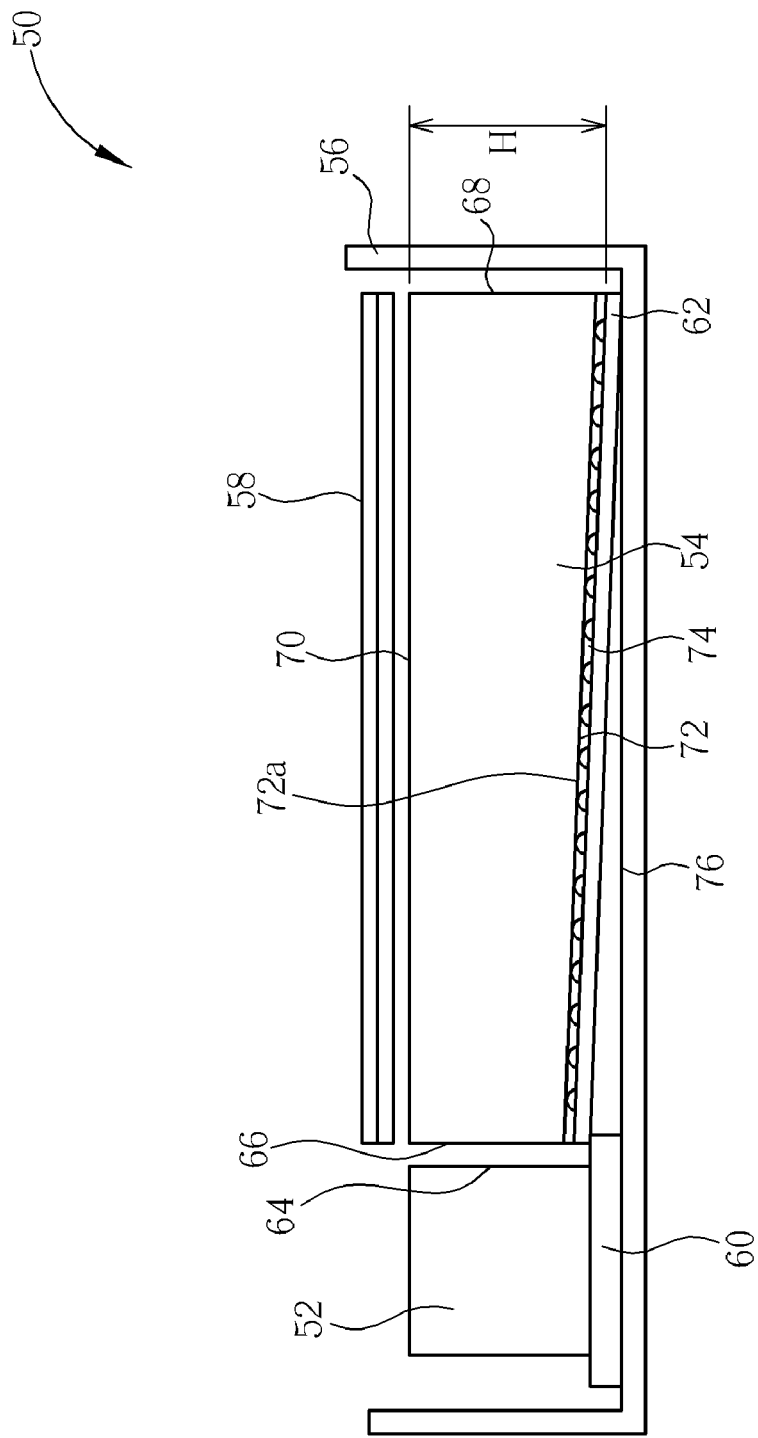

The light guide plate 54 comprises a top plane 70, a bottom plane 72 opposite to the top plane 70, a light entrance plane 66 for accepting light produced by the light source 52 positioned between the top plane 70 and the bottom plane 72, and a widened edge plane 68 positioned between the top plane 70 and the bottom plane 72, wherein the widened edge plane 68 is opposite to the light entrance plane 66. As shown in Fig.2A, the bottom plane 72 is not parallel to the top plane 70 and is slanted relative to the top plane 70, which means the body of the light guide plate 54 is widened from the light entrance plane 66 toward the widened edge plane 68 so that the area of the widened edge plane 68 is larger than that of the light entrance plane 66. The entire inner surface 72a of the bottom plane 72 completely tilts toward the top plane 70 and there is no sharp winding surface formed on the bottom plane 72. The vertical height H of the widened edge plane 68 is also larger than the vertical height h of the light entrance plane 66. For example, the vertical height H is larger than the vertical height h of about 0.1 mm to 2 mm. Accordingly, the light guide plate 54 is a wedge-shaped plate approximately, and the thickness at the side of the widened edge plane 68 is thicker than the thickness at the side of the light entrance plane 66. In addition, according to the preferable embodiment of the present invention, the light guide plate 54 further comprises a scattering pattern structure 74 disposed or formed on the inner surface 72a of the bottom plane 72 for varying the progressing path of light in the light guide plate 54. When light progresses from the light exit plane 64 of the light source 52, it passes through the light entrance plane 66 into the light guide plate 54, and its progressing path is varied by the scattering pattern structure 74 so that light propagates in the whole light guide plate 54 and passes through the top plane 70 and the optical film 58 to the liquid crystal display panel (not shown). Referring to Fig.2B, Fig.2B illustrates another type of scattering pattern structure 74. The scattering pattern structure 74 may be a film adhered to or attached on the bottom surface (or the bottom plane 72) of the light guide plate 54, wherein the bottom plane 72 has a flat and smooth surface.

In this embodiment, the backlight module 50 further comprises a reflector 62 disposed below the bottom plane 72 of the light guide plate 54, and therefore light progresses from the bottom plane 72 will be reflected by the reflector 62 back into the light guide plate 54 so as to increase the utility of light. As shown in FIG. 2A, since the thickness of the light guide plate 54 is comparatively large at the side far from the light source 52, it makes up a deficiency of thickness of the light guide plate 54 in comparison with the thickness of the light source 52 and the circuit board 56. Accordingly, both of the circuit board 60 and the reflector 62 below the widened edge plane 68 can be just positioned at the fixing bottom plane 76 of the housing 56 so that the fixing bottom plane 76 is parallel to the top plane 70.

According to the design of the backlight module 50, the area of the widened edge plane 68 is bigger than that of the light entrance plane 66, such that raw materials of the light guide plate 54 can be injected at the side of the widened edge plane 68 during the injection molding process for fabricating the light guide plate 54, which effectively increases the injection yield and reduces the fabrication difficulty of the light guide plate in the prior art that is extremely thin.

Figure 3:
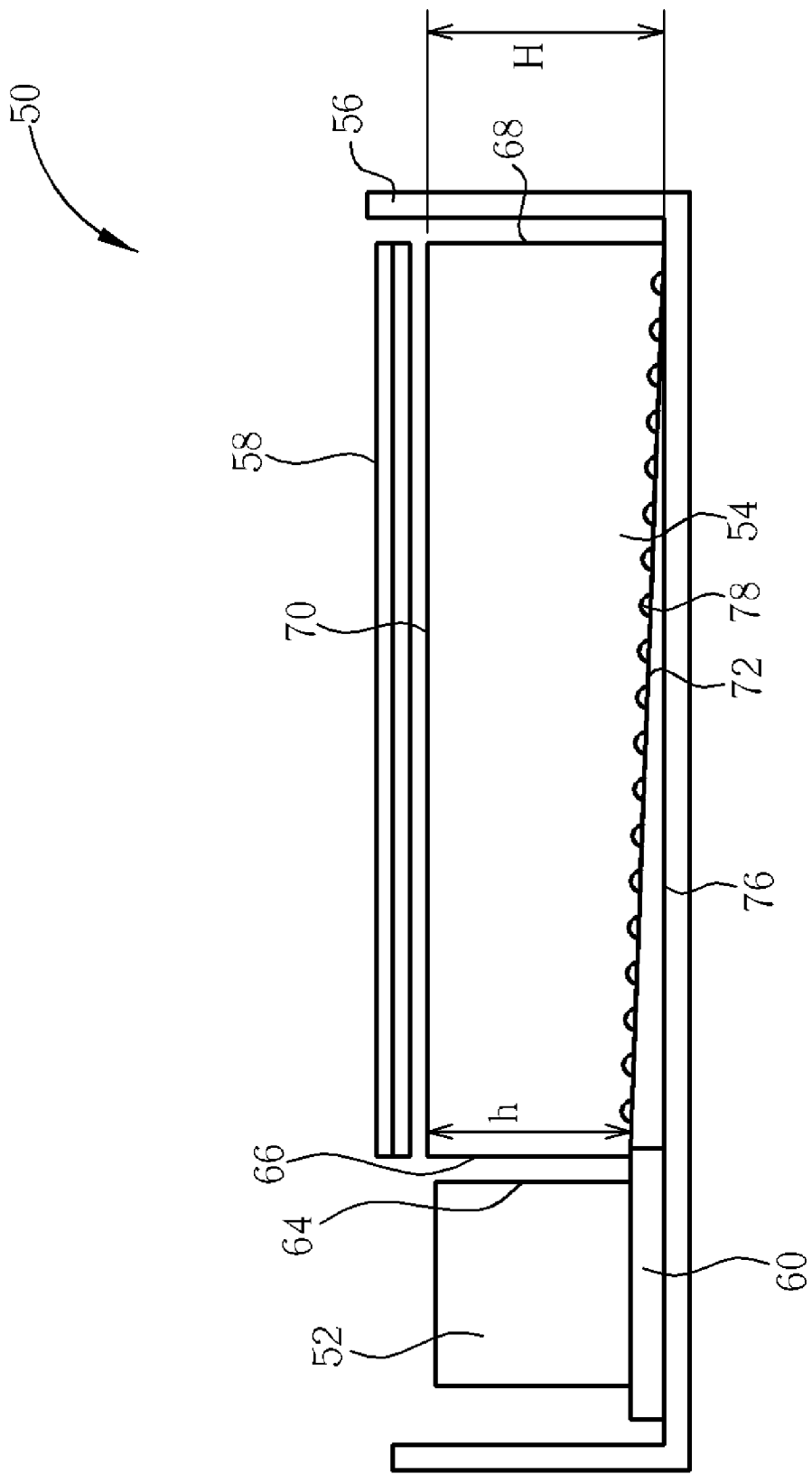
FIG. 3 is a sectional schematic diagram of a backlight module according to a second embodiment of the present invention.

With reference to FIG. 3, FIG. 3 is a sectional schematic diagram of a backlight module according to a second embodiment of the present invention. In order to simplifying the explanation, the elements of FIG. 3 are represented with the same numeral symbols of FIG. 2A. In this embodiment, the housing 56 itself comprises materials with reflective property, such as polished white plastic material, so as to save the whole space of the backlight module 50. Therefore, the height (thickness) of the widened edge plane 68 is approximately the same as the total thickness of the height of the light entrance plane 66 and the thickness of the circuit board 60, while the bottom surfaces of the circuit board 60 and the widened edge plane 68 are both disposed on the fixing bottom plane 76 of the housing 56 approximately. It should be noted that the height H of the widened edge plane 68 is even bigger than that of the first embodiment because the reflector is omitted in this embodiment. As a result, the injection yield of the light guide plate 54 can be even more improved. In addition, a scattering pattern 78 is formed on the inner surface of the bottom plane 72 of the light guide plate 54 in this embodiment, which may be formed by an etching process or a printing process, thus the light path can be improved.

Furthermore, whether the first or the second embodiments of the present invention, both of them can be applied to a conventional backlight module with thinner light sources. In coordination with the wedge-shaped light guide plate of the present invention, the designer may thin the thickness at the side near the light source of the light guide plate but keep the original thickness of the side of the light guide plate far from the light source in order to reduce the entire thickness of the backlight module.

In contrast to the prior, the present invention backlight module has a wedge-shaped light guide plate so that the side of the light guide plate near the light source is thinner than the other side. Therefore, the winding portion of the housing in the prior art is not needed anymore. As a result, the entire thickness of the backlight module can be reduced. In addition, since the widened edge plane has a comparatively large area at the side of the light guide plate far from the light source, raw materials can be injected from the widened edge plane with the large area during the injection molding method to fabricate the light guide plate for improving the process yield of the light guide plate. Therefore, the bottleneck of the fabrication of thin light guide plate in current technology is solved.

Those skilled in the art will readily observe that numerous modifications and alterations of the device and method may be made while retaining the teachings of the invention.

What is claimed is:

1. A backlight module, comprising:
    a light guide plate comprising a top plane, a bottom plane, a light entrance plane positioned between the top plane and the bottom plane, and a widened edge plane opposite to the light entrance plane, the widened edge plane being positioned between the top plane and the bottom plane, the bottom plane being not parallel to the top plane and slanted relative to the top plane, and an area of the widened edge plane being larger than an area of the light entrance plane, wherein an entire inner surface of the bottom plane completely tilts toward the top plane; and
    a light source positioned near and facing the light entrance plane so that light produced by the light source enters the light guide plate through the light entrance plane.

2. The backlight module of claim 1, wherein the light guide plate is widened from the light entrance plane toward the widened edge plane.

3. The backlight module of claim 1, wherein a height of the widened edge plane is larger than a height of the light entrance plane.

4. The backlight module of claim 3, wherein the height of the widened edge plane is larger than the light entrance plane of about 0.1 millimeters (mm) to about 2 mm.

5. The backlight module of claim 1, further comprising a circuit board positioned below the light source.

6. The backlight module of claim 5, wherein the circuit board is a printed circuit board (PCB).

7. The backlight module of claim 5, wherein a height of the widened edge plane is approximately the same as a total height of the light entrance plane and the circuit board.

8. The backlight module of claim 1 further comprising a housing, the housing having a fixing bottom plane parallel to the top plane.

9. The backlight module of claim 1 further comprising a reflector positioned below the bottom plane.

10. The backlight module of claim 1, wherein the light source comprises a light-emitting diode (LED).

11. The backlight module of claim 1 further comprising an optical film positioned above the top plane.

12. The backlight module of claim 1, wherein the light guide plate further comprises a scattering pattern structure disposed on the bottom plane.

13. The backlight module of claim 1, wherein a scattering pattern is formed on an inner surface of the bottom plane of the light guide plate.

14. The backlight module of claim 1, wherein there is no sharp winding surface formed on the bottom plane.

15. The backlight module of claim 1, wherein the bottom plane has a flat and smooth surface.

* * * * *